United States Patent
Wang et al.

[11] Patent Number: 5,873,407
[45] Date of Patent: Feb. 23, 1999

[54] WINDBLOWN-TYPE HEAT-DISSIPATING DEVICE FOR COMPUTER MOTHER BOARD

[75] Inventors: Feng-Ku Wang; Der-Jang Sun, both of Taipei, Taiwan

[73] Assignee: Inventec Corporation, Taipei, Taiwan

[21] Appl. No.: 49,753

[22] Filed: Mar. 27, 1998

[51] Int. Cl.$^6$ ..................................................... H05K 7/20
[52] U.S. Cl. ........................ 165/80.3; 165/122; 165/185; 174/16.3; 361/690; 361/697; 361/704; 361/720
[58] Field of Search .................................. 165/80.3, 121, 165/122, 185; 174/16.3; 361/689, 690, 694, 695, 697, 703, 704, 710, 720

[56] References Cited

U.S. PATENT DOCUMENTS

| | | | |
|---|---|---|---|
| 3,592,260 | 7/1971 | Berger | 165/121 |
| 3,780,798 | 12/1973 | Reimer | 361/690 X |
| 3,956,673 | 5/1976 | Seid | 361/690 |
| 4,790,374 | 12/1988 | Jacoby | 165/185 |
| 5,731,952 | 3/1998 | Ohgami et al. | 361/697 X |
| 5,737,187 | 4/1998 | Nguyen et al. | 361/704 |

Primary Examiner—Leonard R. Leo
Attorney, Agent, or Firm—Mikio Ishimaru

[57] ABSTRACT

A windblown-type heat-dissipating device is designed for use on a circuit board, such as a computer mother board, that is installed inside a computer casing having an air inlet, an air outlet, and air sucking means. The heat-dissipating device comprises a base plate; a plurality of heat-conductive members upright mounted on the base plate; and a plurality of air-guide walls, including a first air-guide wall which is arranged substantially in parallel to the first side of the base plate and near the air inlet; a second air-guide wall having a first end arranged on the third side of the base plate and a second end near the center of the base plate, forming a curved shape that can divert the air stream from the air inlet toward the air outlet, and which has a low portion and a high portion; and a third air-guide wall having a first end arranged at the corner between the third side and the fourth side of the base plate and a second end arranged toward the air outlet. In the foregoing structure, the particular arrangement of the air-guide walls allows the air stream from the air inlet to flow evenly over all the heated portions of the heat-conductive members such that the heat-dissipating efficiency is high.

7 Claims, 2 Drawing Sheets

WINDBLOWN-TYPE HEAT-DISSIPATING DEVICE FOR COMPUTER MOTHER BOARD

BACKGROUND OF THE INVENTION

1. Field of the Invention

This invention relates to heat-dissipating means, and more particularly, to a windblown-type heat-dissipating device for use on a circuit board, such as a computer mother board, for the purpose of dissipating heat produced from the circuit components on the circuit board.

2. Description of Related Art

During the operation of a circuit board, such as a computer mother board, heat can be produced from some circuit components, such as the CPU (central processing unit), that if not properly dissipated, can cause damage to their internal circuitry. A conventional way of dissipating the heat from a CPU is to mount a heat-conductive member on the CPU and then use an air-sucking means to cause an air stream to flow over the heat-conductive member such that the heat from the CPU can be dissipated. This conventional way of dissipating heat from a CPU is illustratively depicted in the following with reference to FIG. 2.

As shown in FIG. 1, the conventional heat-dissipating device includes an electric fan 1, an air inlet 2, a heat-conductive member 4, and an air outlet 5. The CPU is mounted beneath the heat-conductive member 4. The electric fan 1 and the air outlet 5 are provided in one sidewall 32 of the casing 3 of the computer, while the air inlet 2 is provided in the other sidewall 31 of the casing 3. When the electric fan 1 is being operated, it can suck the cool air from the outside through the air inlet 2 to flow over the heat-conductive member 4 and then drain out to the outside through the air outlet 5. The flowing air can thus bring the heat on the heat-conductive member 4 from the CPU to the outside, thereby maintaining the CPU at a low temperature. One drawback to the foregoing heat-dissipating device, however, is that part of the air being sucked in through the air inlet 2 can be diverted away from the CPU to an area indicated by A in FIG. 2 instead of flowing to the area B where the CPU is mounted. This is because that the path from the air inlet 2 via the area A to the air outlet 5 is shorter than the path from the air inlet 2 via the CPU and then via the electric fan 1 to the air outlet 5. Since this part of the incoming cool air will not contribute to the cooling of the CPU, the overall heat-dissipating efficiency is considerably low. This drawback not only causes the electric fan 1 to waste more electric power, but also causes the CPU to be easily subjected to damage since the heat-dissipating efficiency is inadequate.

SUMMARY OF THE INVENTION

It is therefore an objective of the present invention to provide a windblown-type heat-dissipating device which can dissipate the heat from the CPU more efficiently.

It is another an objective of the present invention to provide a windblown-type heat-dissipating device which can allow the cool air to evenly flow over all the heated portions of the heat-conductive member so as to fully utilize the cool air to maintain the CPU at a low temperature.

In accordance with the foregoing and other objectives of the present invention, a new windblown-type heat-dissipating device is provided. The heat-dissipating device of the invention is designed for use on a circuit board installed inside a computer casing having an air inlet, an air outlet, and means to provide an air stream flowing from the air inlet to the air outlet. The heat-dissipating device comprises a base plate having a first side arranged near the air outlet, a second side arranged near the air inlet a third side opposite to the first side, and a fourth side opposite to the second side; a plurality of heat-conductive members upright mounted on the base plate; and a plurality of air-guide walls, including a first air-guide wall which is arranged substantially in parallel to the first side of the base plate and near the air inlet and having a first end and a second end, with the first end slightly bent inwards; a second air-guide wall having a first end arranged on the third side of the base plate and a second end near the center of the base plate, forming a curved shape that can divert the air stream from the air inlet toward the air outlet, and which has a low portion and a high portion; and a third air-guide wall having a first end arranged at the corner between the third side and the fourth side of the base plate and a second end arranged toward the air outlet. In the foregoing structure, the opening bounded by the first end of the first air-guide wall and the second end of the second air-guide wall is larger in dimension than the opening bounded by the second end of the second air-guide wall and the second end of the third air-guide wall, effectively allowing the air stream to flow evenly over all the heated portions of the heat-conductive members.

To allow the air stream from the air inlet to flow into the area confined by the second air-guide wall and the third air-guide wall, two provisions are formed: the low portion of the second air-guide wall and the reduced height in those heat-conductive posts near the low portion of the second air-guide wall. The provision of the opening bounded by the first end of the first air-guide wall and the second end of the second air-guide wall to be larger in dimension than the opening bounded by the second end of the second air-guide wall and the second end of the third air-guide wall allows the air stream to be accelerated when passing through the smaller opening, effectively allowing the air stream to flow evenly over all the heated portions of the heat-conductive members. Further, the heat-dissipating device comprises a fourth air-guide wall having a first end arranged on the third side of the base plate and a second end arranged toward the air outlet and which is substantially aligned in perpendicular to the third side.

To allow the air stream to flow with less resistance into the area confined by the second air-guide wall and the third air-guide wall, a group of the heat-conductive posts that are located within the area confined by the first air-guide wall and the second air-guide wall and near the low portion of the third air-guide wall are smaller in height than other heat-conductive posts.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
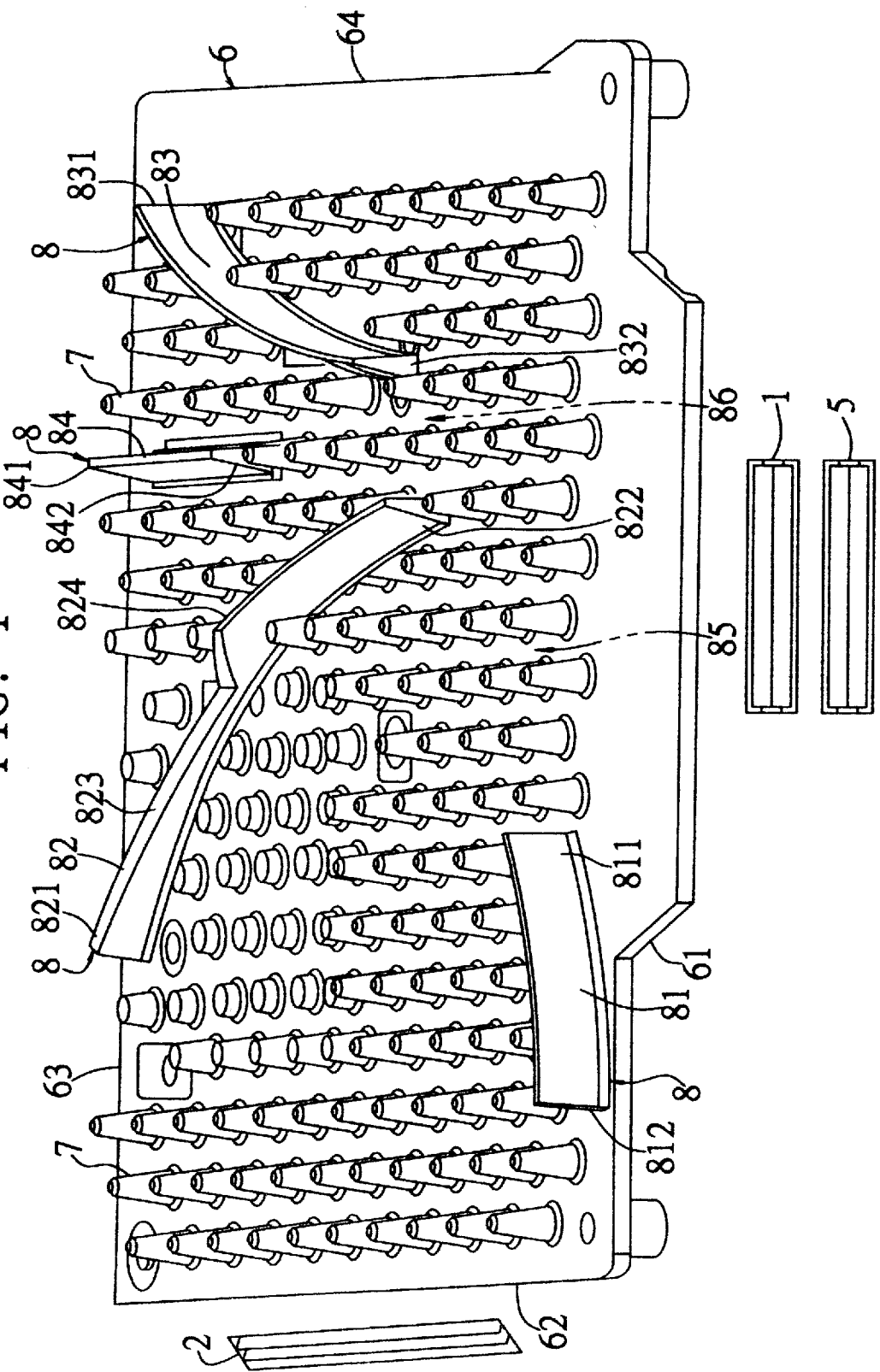
FIG. 1 is a schematic perspective view of the windblown-type heat-dissipating device according to the invention.
Figure 2:
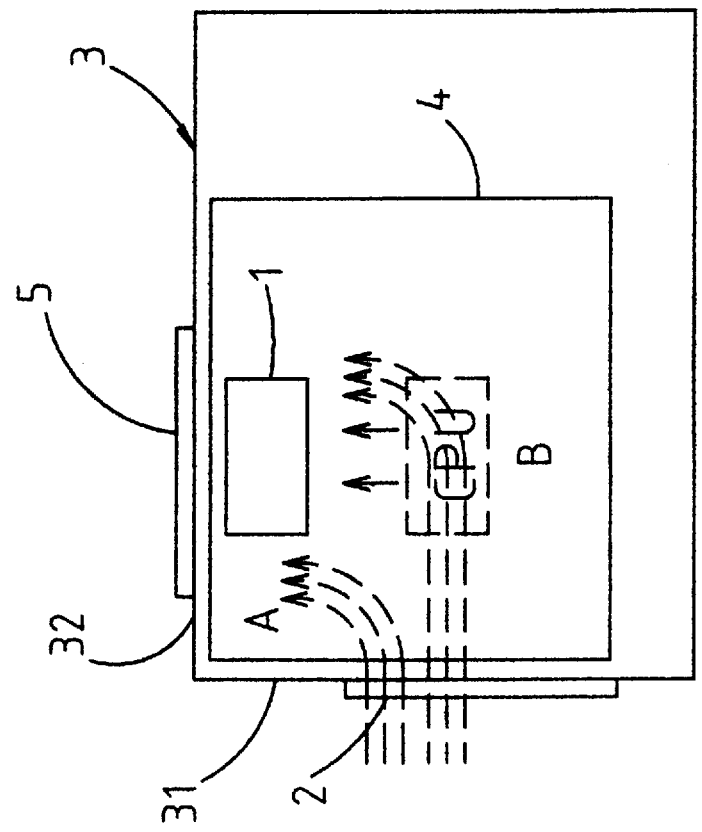
FIG. 2 is a schematic diagram used to depict a conventional heat-dissipating device utilized on a computer mother board for the purpose of dissipating heat produced from a CPU on the mother board.

FIG. 1 is a schematic perspective view of the windblown-type heat-dissipating device according to the invention which is designed to be mounted on the CPU of a computer mother board (not shown) mounted inside a computer casing. The heat-dissipating device includes an electric fan 1, an air inlet 2 formed in one sidewall of the casing (not shown) of the computer, and an air outlet 5 formed in the other sidewall of the casing (not shown) near the electric fan 1.

The heat-dissipating device of the invention also includes a base plate 6 having a first side 61 arranged near the electric fan 1, a second side 62 arranged near the air inlet 2, a third side 63 arranged opposite to the electric fan 1, and a fourth side 64 arranged opposite to the air inlet 2. Further, the heat-dissipating device includes a plurality of heat-conductive members, such as heat-conductive posts 7, which are arranged upright in rows on the base plate 6, and an air-guide wall set 8 which are arranged at specific locations on the base plate 6.

The air-guide wall set 8 includes four air-guide walls: a first air-guide wall 81, a second air-guide wall 82, a third air-guide wall 83, and a fourth air-guide wall 84. The first air-guide wall 81 is arranged substantially in parallel to the first side 61 of the base plate 6 and near the air inlet 2 and has a first end 811 and a second end 812, with he first end 811 slightly bent inwards. The second air-guide wall 82 has a first end 821 arranged on the third side 63 of the base plate 6 and a second end 822 near the center of the base plate 6, forming a curved shape that can divert the air stream from the air inlet 2 toward the electric fan 1, and which has a low portion 823 and a high portion 824. The third air-guide wall 83 has a first end 831 arranged at the corner between the third side 63 and the fourth side 64 of the base plate 6 and a second end 832 arranged toward the air outlet 5. The fourth air-guide wall 84 has a first end 841 arranged on the third side 63 of the base plate 6 and a second end 842 arranged toward the air outlet 5, and which is substantially aligned in perpendicular to the third side 63. It can be seen from FIG. 1 that the opening 85 bounded by the first end 811 of the first air-guide wall 81 and the second end 822 of the second air-guide wall 82 is larger in dimension than the opening 86 bounded by the second end 822 of the second air-guide wall 82 and the second end 832 of the third air-guide wall 83. With this arrangement, the air stream that is sucked in by the electric fan 1 can effectively flow over the area confined by the second air-guide wall 82 and the third air-guide wall 83 due to the fact that the opening 86 is smaller than the opening 85 such that the air stream flowing through the smaller opening 86 would be higher in speed than the air stream flowing through the larger opening 85.

The provision of the fourth air-guide wall 84 allows the air stream in the area confined by the second air-guide wall 82 and the third air-guide wall 83 to be further accelerated, so that it would not be decreased in speed due to the extended path. To allow the air stream from the air inlet 2 to flow into the area confined by the second air-guide wall 82 and the third air-guide wall 83, two provisions are formed: the low portion 823 of the second air-guide wall 82 and the reduced height in those heat-conductive posts 7 near the low portion 823 of the second air-guide wall 82.

In conclusion, the invention provides a heat-dissipating device that is arranged with a plurality of air-guide walls which allow the air stream sucked into the casing of the computer to flow evenly over the heat sources on the circuit board where heat is produced, allowing the cool air stream to more efficiently undergo heat exchange with all the heat-conductive posts on the base plate.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A heat-dissipating device for use on a circuit board installed inside a computer casing having an air inlet, an air outlet, and means to provide an air stream flowing from the air inlet to the air outlet, said heat-dissipating device comprising:

a base plate having a first side arranged near the air outlet and a second side arranged near the air inlet;

a plurality of heat-conductive members upright mounted on said base plate;

a plurality of air-guide walls, including a first air-guide wall which is arranged substantially in parallel to the first side of said base plate and near the air inlet and having a first end and a second end, with the first end slightly bent inwards;

a second air-guide wall having a first end arranged on the third side of said base plate and a second end near the center of the base plate, forming a curved shape that can divert the air stream from the air inlet toward the air outlet, and which has at least a low portion; and a third air-guide wall having a first end arranged at the corner between the third side and the fourth side of the base plate and a second end arranged toward the air outlet;

wherein the opening bounded by the first end of said first air-guide wall and the second end of said second air-guide wall is larger in dimension than the opening bounded by the second end of said second air-guide wall and the second end of said third air-guide wall, effectively allowing the air stream to flow evenly over all the heated portions of the heat-conductive members.

2. The heat-dissipating device of claim 1, further comprising a fourth air-guide wall having a first end arranged on the third side of the base plate and a second end arranged toward the air outlet, and which is substantially aligned in perpendicular to the third side.

3. The heat-dissipating device of claim 1, wherein said fourth air-guide wall is substantially aligned in perpendicular to the third side.

4. The heat-dissipating device of claim 1, wherein said first air-guide wall is a curved piece.

5. The heat-dissipating device of claim 1, wherein said third air-guide wall is a curved piece.

6. The heat-dissipating device of claim 1, wherein said heat-conductive members are shaped into posts.

7. The heat-dissipating device of claim 6, wherein a group of said heat-conductive posts that are located within the area confined by said first air-guide wall and said second air-guide wall and near the low portion of said third air-guide wall are smaller in height than other heat-conductive posts.

\* \* \* \* \*